Jan. 16, 1968     A. ROTH     3,363,784

DEVICE FOR LATERALLY CONVEYING AND DEPOSITING MOTOR VEHICLES

Filed Oct. 5, 1964

United States Patent Office 3,363,784
Patented Jan. 16, 1968

3,363,784
DEVICE FOR LATERALLY CONVEYING AND DEPOSITING MOTOR VEHICLES
Anton Roth, Brentano-Strasse 18,
Frankfurt am Main, Germany
Filed Oct. 5, 1964, Ser. No. 401,479
Claims priority, application Germany, Oct. 7, 1963,
R 36,283
3 Claims. (Cl. 214—16.1)

The invention relates to a method for the lateral conveying and depositing of stacked freight, in particular of motor vehicles, as well as to a device for carrying out this method. The device is particularly designed for installation in warehouses, multi-story and underground garages, in which the motor vehicles are driven to various floor levels by an elevator and are deposited in bays to the right and left of the elevator. The method and the device according to the invention are thus chiefly designed to convey motor vehicles in the direction of the vehicles' axes under their own power to an approach near the platform of an elevator, to be driven from this approach directly on this platform and to be removed from the bays, after the acceleration of the platform in the simplest manner, to bays provided to the left or the right of the elevator entrance.

Stacking or conveying installations for lateral displacement for this purpose are known. There are employed for this purpose so-called eccentric or spreader stackers which are capable of conveying loads in a horizontal direction only after a corresponding vertical eccentric movement of the load carrier or carrier element. Vertical movements of this type can only be carried out at a prohibitive construction cost because they require auxiliary adjustment and control means to prevent the danger of tipping. Additionally, it is necessary to have a prohibitively large "swinging" space for a lateral movement as well as further space to make possible the return of the eccentric or spreader stacker after depositing the freight or motor vehicles.

Even when this increased space requirement can be tolerated, such eccentric of spreader stackers are disadvantageous because they have to be designed in a special manner for stacking motor vehicles since the motor vehicles have different shaft and wheel clearances which require additional substantial construction expenses and frequently additional devices in order to adapt the fork lifts or lifting part to the particular weights of the motor vehicles.

The invention dispenses with these disadvantages. It proposes a method in which a laterally displaceable telescoping receiving mechanism is brought under a motor vehicle and is lifted free of the ground. The vehicle is then moved sideways and set down while the receiving mechanism is moved back.

Thus, in contrast to the known state of the art, the lateral displacement of stacked freight, particularly of motor vehicles is independent of the clearances between the shafts, the wheels and the ground. As disclosed above and shown in the drawing, the conveyor carriage or conveyor carriages are designated by the numeral 2. These conveyor carriages are carriers for the scoop-like pick-up devices 4. These again are mounted on the hydraulic means 13 with the help of the telescopic shifting means 14, thus being a part of the conveyor carriage. The adjustment of the conveyor means and lifting mechanisms to different measurements of the vehicles is obviated. Misalignment of weight when lifting the motor vehicles and moving these laterally are dispensed with. The lifting, the lateral displacement and setting down of the vehicles requires a minimum of space, so that lifting from the ground in the direction of a real vertical upward movement is obviated.

The device for carrying out the method consists of at least one laterally displaceable conveyor carriage, or of a pair of conveyor carriages which are displaceable laterally and are coordinated in their movement, on both sides of the stacked freight or motor vehicle and which convey the vehicle laterally. For this purpose the laterally displaceable conveyor carriage comprises a laterally and vertically displaceable pick-up mechanism and opposed conveying carriages. Advantageously both of the pick-up mechanisms are laterally displaceable with respect to one another. It suffices, however, to have one of the pick-up mechanisms move in and out and construct the other as stationary.

The pick-up mechanism itself consists advantageously of scoop-like palettes which are provided at their lower surfaces with appropriate casters, rollers or sliding devices with a minimum of friction for the lateral displacement of the conveyor carriages.

The pick-up mechanisms proper may be constructed with one or several ramp mechanisms at their end. These ramp mechanisms make it easier to grasp the wheels of the motor vehicle from below. The vehicles may be picked under by the pick-up mechanisms in the simplest manner and lifted free of the ground without appreciable effort. These pick-up mechanisms may be provided with switches for limiting the mechanisms' movements or they may be constructed as automatic pick-up mechanisms. These switches can control the in-and-out driving force of the telescopic hydraulic pressure pick-up mechanisms in dependence on the particular weight of the motor vehicle which is to be driven laterally and set down. The switches can also arrest the movement of one thrust means while the opposite thrust means continues its work.

The single or both conveyor carriages may be provided at their undersides with rollers or other appropriate sliding means which run on tracks or on the flat floor of the conveyor or stocking space.

Adequate space is provided for installation and movement of the conveyor carriages according to the invention, since both the required height as well as the horizontal expanse of the thrust means is practically independent of the dimensions of the motor vehicles which are to be lifted. Because these conveyor carriages extend beyond the ground plan or outline of the vehicles and due to their small measurements they may be accommodated in a space normally required for stacking and for turning about the motor vehicle.

The conveyor carriages are advantageously provided with stabilizers which prevent their lateral tilting or upward clambering. These stabilizers can preferably consist of vertical frame structures or various vertical or horizontal stabilizers known in the art and which are displaceable in guide frames, rails, or various lateral supports in the conveyor and the stacking space. Furthermore, stabilizing weights may be provided to assure that the single or multiple conveyor carriages will not tilt when picking up heavier loads.

It may likewise be advantageous, depending on the design or construction of the stacking space and the type of freight to be stacked, to provide guide rails on the side walls of the space for the conveyor carriages. Switches may be introduced in the rail areas which would limit the displacement of the conveyor carriage or carriages and various switches for the movement cycle may be set in motion. These switches may be actuated in a simple manner by the respective conveyor carriages.

A simple embodiment of the device according to the invention resides in making only the pick-up mechanism of the single conveyor carriage displaceable, while leaving the similar opposite conveyor carriage stationary so that it can not be displaced. The pick-up of the motor vehicle is thus effected only by the horizontal displacement of a ramp mechanism which pushes the motor vehicle in axial direction until the oppositely disposed pick-up mechanism likewise underlies the motor vehicle. This horizontal movement is arrested by the previously described switch means as soon as the motor vehicle is rolled onto the receiving mechanism to a corresponding stop.

The run-up mechanism itself or parts thereof may be movable in a loading and unloading direction. Inequalities in the lateral displacement of both conveyor carriages and the bracing of the loaded motor vehicles may be equilized. The lateral displacement of the conveyor carriages to and from the elevator platform is effected by known pushing means and is controlled by known control devices.

The receiving devices are provided at the underside with rollers. This eases the lateral travel of the conveyor carriage which rides on rails to the right or left of the box to be loaded and then in a reverse direction.

An embodiment of the device according to the invention is illustrated in the accompanying drawing where it is shown as built in a multi-story garage with elevators. The vehicles are thus deposited in two bays to the right and left of the elevators on each floor.

Figure 1:
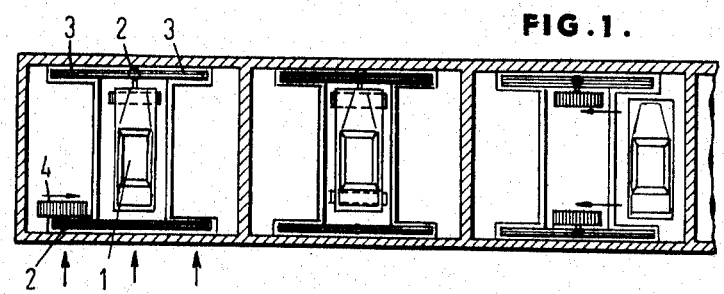
FIG. 1 is a horizontal cross-section of the multi-story garage.

As shown in FIG. 1, the storage bays are so arranged that two bays are disposed to the left and right of each elevator. The motor vehicles which are to be set down in the respective bays are driven up by the vertical elevators and then deposited, by a lateral displacement, in one of the bays. For this purpose the motor vehicles 1 are driven under their own power on the ground floor.

As shown by the arrows to the left of FIG. 1, the vehicles may be driven into the bays to the left or the right of the platform on the ground or directly on the platform. In the first case the motor vehicle which is driven in must first be driven sideways on the platform by means of the laterally displaceable conveyor carriage 2, the details of which will be described later. This situation is not disadvantageous, because another motor vehicle may be driven in at the same time into the other bay so that time may be saved. As soon as the elevator laden with a motor vehicle comes to a standstill at any floor level it is deposited, by the same conveyor carriage 2, which rode up with the platform either in the left or in the right bay. As shown in the center of FIG. 1, the motor vehicle which has been lifted on the elevator platform is about to be moved into the right bay and in the direction of the arrow, to be set down in said bay. The arrow to the right of FIG. 1 shows how the vehicle deposited in the right bay may again be moved on the platform of the vertical lift and may be brought back to the ground floor, to be driven out through the exit end.

A special construction of the platform of the vertical elevator is especially advantageous for introducing the laterally displaceable conveyor carriages. These are provided on both sides with overhanging carriers for the guide rails 3, of the laterally displaceable conveyor carriages 2. These are provided in this embodiment on both sides of the transversely extending front end of the elevator platforms but many however be disposed in another position.

As shown in FIG. 1, the platform on which the motor vehicles are driven from the different stories of the parking garage consists of a rectangular platform. At both ends of this platform there is mounted a carrier extending over the both longitudinal side edges of the platform to the right and left, so that viewed from above, the platform has a T-shaped configuration. On these both ends are mounted the carriers and said carriers the rails on which the conveyor carriage 2 may travel to the right and left from the center together with the supported motor vehicles in order to ride either into the left or right box near the loading platform.

In order that the loading platform may be driven with these carriers, extending over the ends through all the stories, the individual floors are provided with respective recesses. They must extend into the area of the side deposit bays to the left and right, respectively, in order to make possible the lateral travel of the conveyor carriages to such an extent that the individual motor vehicles may be conveyed into the bays to the left or right of the elevator shaft and may again be removed from said bays.

The individual parking areas in the side bays are correspondingly recessed at each place in which the laterally overhanging guides are provided on the elevator platform.

Two laterally displaceable conveyor carriages 2 are provided for picking up and for the lateral displacement of each of the motor vehicles which are driven on the elevator platform, and these are moved laterally in a suitable manner and by using known means. Care is first taken that at least the conveyor carriage which is mounted on the incoming side of the elevator platform has moved to the middle or as far to the right or the left of the bays, that the motor vehicle which is to be parked may ride under its own power to the right or left into the ground floor bays or directly on the platform of the elevator. At the same time the second conveyor carriage is disposed at the opposite side of the platform or the rear side thereof while the wagon rides up directly on the platform as shown to the left of FIG. 1, or to a position which corresponds to the conveyor carriages disposed forwardly. As soon as the motor vehicle is in one of the ground floor bays or on the elevator platform, the conveyor carriages 2 move sideways until the receiving mechanism 4 of the said carriages can get under the wheels of the respective motor vehicle so that it is disposed thereunder.

When this has taken place, the motor vehicle, to the extent that it has ridden into one of the ground floor bays is at first driven to the middle by a synchronous displacement of both conveyor carriages. Should the motor vehicle already be driven on the platform then the lateral movement is dispensed with, because the motor vehicle is already on the platform. Now the motor vehicle is lifted with this platform to the desired floor. As soon as this floor is reached, the vehicle is driven by the lateral action of the conveyor carriage, synchronously into the left or right bays. As soon as both conveyor carriages have come to a standstill, the pick-up mechanism 4 is drawn into the starting position, whereby the corresponding motor vehicle is set down in one of the side bays. Both of the conveyor carriages are now driven back to the level of the pick-up platform and together with it reach the ground floor and are again displaced laterally on their guides in order that other motor vehicles may be picked up or driven on the platform. The repeated parking and departure of the motor vehicle takes place according to this repeated work cycle.

Figure 2:
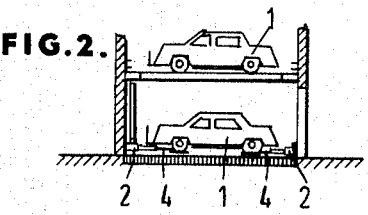
FIG. 2 is a vertical section of the construction shown in FIG. 1.
Figure 4:
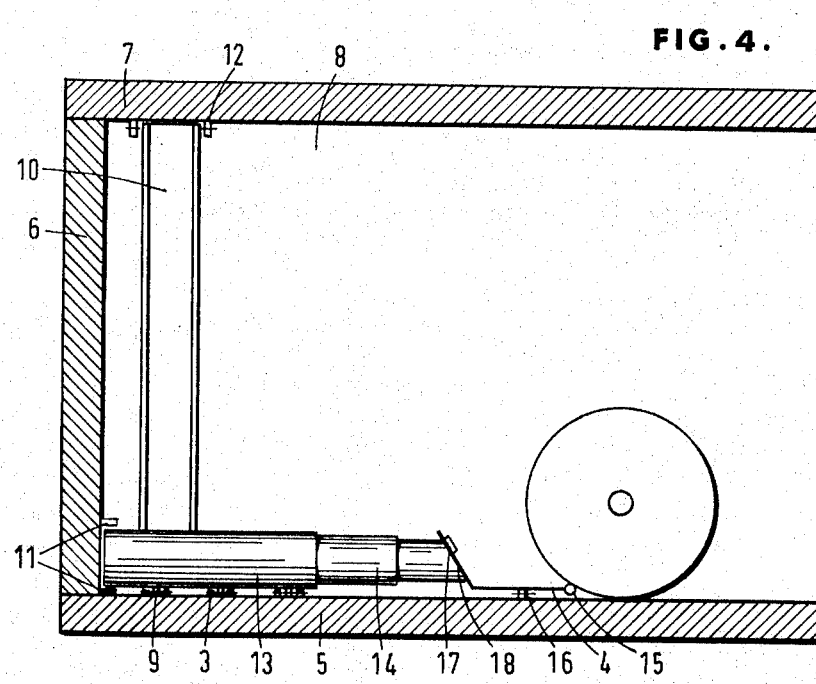
FIG. 4 is a vertical section, on an enlarged scale, of the garage.

FIG. 4 illustrates schematically the details of the briefly described conveyor carriage 2 with the pick-up mechanisms 4. In this enlarged partial vertical cross-section through one of the lateral bays shown in FIGS. 1 and 2, there is illustrated a floor 5 and end wall 6 which extends through the entrance openings in the ground floor to the opposite side (not shown).

The ceiling is indicated by the numeral 7. Details of the garage building construction, such as windows, etc., have been up to the invention. A conveyor carriage 2 is displaceable in bays 8, above the floor 5, by means of rollers 9 in the guide rails 3. The conveyor carriage is supported vertically against the ceiling 7 by a stabilizer 10, shown only schematically and laterally by means of rails 11. This stabilizer is rigidly secured to the conveyor carriage 2 and slides along the ceiling in the guide rails 12. Guide rails 3 for the stabilizer are provided in the floor and in both bays and on the frame of the elevator. These rails are interrupted only at the junction points between the floors and ceilings and the corresponding part of the elevator, which however is not disadvantageous with regards to appearance, because the interruptions are relatively short and equalized by the stabilizers and at the conveyor carriages or at their individual parts.

Thrust means 13 are provided at the end of the wall adjacent the side of the conveyor carriage. This thrust means carries on its free end the pick-up equipment which is constructed like a scoop and reaches under the vehicle wheels when it's moved and thus frees these from the floor without the necessity of a cam movement. The end walls of the pick-up mechanisms are provided with one or more slide rollers 15, in order to make it easier to pick-up the vehicle wheels, which are necessarily provided with brakes. The pick-up mechanisms 4 are further provided at their undersides with one or more freely movable slide rollers 16, in order to support the lateral movement of the conveyor carriage along the guide rails.

A switch 17 is mounted in the ramp mechanism of the pick-up equipment and this switch disconnects the thrust means 14 and switches on the lateral movement means as soon as the conveyor carriage arrives under the vehicle and reaches the incline 18 of the pick-up mechanism.

The shifting means 14 or the pick-up mechanism 4 or the parts thereof may be mounted displaceably and horizontally in order to equalize the differences of movement between both conveyor carriages 2.

Figure 3:
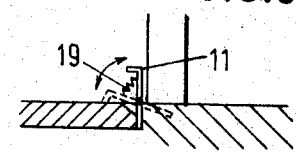
FIG. 3 is an enlarged detail.

FIG. 3 illustrates how the guide rail 11 can be hinged downwardly at the entrance end of the pick-up platform against the action of a retaining spring in order that the incoming motor vehicle may drive in from this side without clambering.

What I claim is:

1. A device for handling vehicle comprising, a multi-level building, a vertically movable elevator located in said building, parking stalls located on at least one side of said elevator at each level, said elevator having a platform with at least a pair of lateral projections spaced apart for at least the length of a vehicle, said projections extend into said stalls, two carriages, each carriage being mounted for motion on the elevator and along a projection, wheel engaging means mounted separately on each carriage, means to extend or retract at least one wheel engaging means in a direction longitudinally of the vehicle to be handled and transverse to the projections, the extension of said wheel handling means forces the same under the vehicle wheels to thereby permit laterally shifting of a vehicle between the elevator and stall while all four wheels are carried on the wheel engaging means.

2. Device according to claim 1, further provided with means for mounting said extensible means for guided movement on the side and ceiling of said building.

3. Device according to claim 2, further provided with switch means for controlling the movement of said extensible means.

References Cited

UNITED STATES PATENTS

| | | | |
|---|---|---|---|
| 1,584,517 | 5/1926 | Dinkelberg | 214—16.1 |
| 2,773,614 | 12/1956 | Edwards et al. | 214—38 |
| 2,858,032 | 10/1958 | Morley | 214—16.1 |
| 2,876,913 | 3/1959 | F. Roth | 214—16.1 |
| 3,091,349 | 5/1963 | A. Roth | 214—16.1 |
| 3,219,207 | 11/1965 | Chasar | 214—16.4 |
| 3,240,365 | 3/1966 | King | 214—16.4 |

FOREIGN PATENTS

| | | |
|---|---|---|
| 154,013 | 9/1953 | Australia. |
| 1,160,793 | 3/1958 | France. |
| 777,989 | 7/1957 | Great Britain. |

GERALD M. FORLENZA, *Primary Examiner.*

R. B. JOHNSON, *Assistant Examiner.*